(12) United States Patent
Nainar et al.

(10) Patent No.: US 12,192,100 B2
(45) Date of Patent: Jan. 7, 2025

(54) CENTRALIZED PATH COMPUTATION FOR INFORMATION-CENTRIC NETWORKING

(71) Applicant: Cisco Technology, Inc., San Jose, CA (US)

(72) Inventors: Nagendra Kumar Nainar, Morrisville, NC (US); Carlos M. Pignataro, Cary, NC (US); Luca Muscariello, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/972,545

(22) Filed: Oct. 24, 2022

(65) Prior Publication Data

US 2023/0041526 A1 Feb. 9, 2023

Related U.S. Application Data

(63) Continuation of application No. 16/601,352, filed on Oct. 14, 2019, now Pat. No. 11,483,238.

(51) Int. Cl.
*H04L 45/64* (2022.01)
*H04L 45/42* (2022.01)
(Continued)

(52) U.S. Cl.
CPC .............. *H04L 45/64* (2013.01); *H04L 45/42* (2013.01); *H04L 45/742* (2013.01); *H04L 69/22* (2013.01)

(58) Field of Classification Search
CPC ....... H04L 45/00; H04L 67/63; H04L 67/568; H04L 69/22; H04L 45/74; H04L 45/64
See application file for complete search history.

(56) References Cited

U.S. PATENT DOCUMENTS

| 7,889,675 | B2 * | 2/2011 | Mack-Crane | ........... H04L 45/00 370/254 |
| 8,879,433 | B2 * | 11/2014 | Khojastepour | ........ H01Q 21/00 370/278 |

(Continued)

FOREIGN PATENT DOCUMENTS

| CN | 105721536 | 6/2016 |
| CN | 105812462 | 7/2016 |

(Continued)

OTHER PUBLICATIONS

Conti et al., "The Road Ahead for Networking: A Survey on ICN-IP Coexistence Solutions," retrieved on Sep. 3, 2019 at <<https://arxiv.org/pdf/1903.07446.pdf>>, Cornell University cs.NI, Submitted on Mar. 18, 2019.

(Continued)

*Primary Examiner* — Hassan A Phillips
*Assistant Examiner* — Prenell P Jones
(74) *Attorney, Agent, or Firm* — Lee & Hayes, P.C.

(57) ABSTRACT

This disclosure describes techniques for implementing centralized path computation for routing in hybrid information-centric networking protocols implemented as a virtual network overlay. A method includes receiving an interest packet header from a forwarding router node of a network overlay. The method further includes determining an interest path of the interest packet and one or more destination router nodes of the network overlay. The method further includes computing one or more paths over the network overlay. The method further includes determining an addressing method for the one or more computed paths over the network overlay. The method further includes performing at least one of encoding each computed path in a data packet header, and encoding each computed path as state entries of each router node of the network overlay on each respective path. The (Continued)

method further includes returning the computed path information to the forwarding router node.

17 Claims, 8 Drawing Sheets

(51) Int. Cl.
*H04L 45/74* (2022.01)
*H04L 69/22* (2022.01)

(56) References Cited

U.S. PATENT DOCUMENTS

| | | | |
|---|---|---|---|
| 9,049,251 B2 | 6/2015 | Ravindran et al. | |
| 9,836,540 B2 | 12/2017 | Mosko | |
| 10,033,639 B2* | 7/2018 | Garcia-Luna-Aceves | H04L 45/021 |
| 10,237,189 B2* | 3/2019 | Garcia-Luna-Aceves | H04L 45/18 |
| 10,333,840 B2* | 6/2019 | Garcia-Luna-Aceves | H04L 67/63 |
| 10,454,820 B2* | 10/2019 | Garcia-Luna-Aceves | H04L 67/63 |
| 2003/0041178 A1 | 2/2003 | Brouk et al. | |
| 2003/0235155 A1* | 12/2003 | Boivie | H04L 45/26 370/400 |
| 2005/0152286 A1* | 7/2005 | Betts | H04L 45/03 370/255 |
| 2012/0026917 A1* | 2/2012 | Guo | H04L 47/626 370/254 |
| 2012/0307729 A1 | 12/2012 | Selen et al. | |
| 2013/0286817 A1* | 10/2013 | Allan | H04L 45/484 370/221 |
| 2014/0294005 A1* | 10/2014 | Jain | H04L 61/103 370/392 |
| 2015/0208316 A1 | 7/2015 | Mosko et al. | |
| 2015/0319099 A1 | 11/2015 | Yamato et al. | |
| 2015/0381775 A1 | 12/2015 | Ashida | |
| 2016/0119234 A1 | 4/2016 | Valencia Lopez et al. | |
| 2016/0182353 A1* | 6/2016 | Garcia-Luna-Aceves | H04L 45/306 709/241 |
| 2016/0309992 A1 | 10/2016 | Stith et al. | |
| 2017/0064028 A1 | 3/2017 | Westphal et al. | |
| 2017/0142226 A1 | 5/2017 | De Foy et al. | |
| 2017/0230290 A1 | 8/2017 | Li et al. | |
| 2017/0237660 A1 | 8/2017 | Trossen et al. | |
| 2017/0272532 A1 | 9/2017 | Lynch et al. | |
| 2017/0359254 A1 | 12/2017 | Oran et al. | |
| 2018/0019956 A1 | 1/2018 | Ravindran et al. | |
| 2018/0102911 A1 | 4/2018 | Kojima | |
| 2018/0103128 A1 | 4/2018 | Muscariello et al. | |
| 2018/0131673 A1 | 5/2018 | White et al. | |
| 2018/0159962 A1 | 6/2018 | Solis | |
| 2018/0206278 A1 | 7/2018 | Mildh et al. | |
| 2018/0241671 A1 | 8/2018 | Bosch et al. | |
| 2018/0242186 A1 | 8/2018 | Muscariello et al. | |
| 2018/0343194 A1* | 11/2018 | Liu | H04L 45/741 |
| 2019/0223045 A1 | 7/2019 | Roeland et al. | |
| 2019/0356575 A1 | 11/2019 | Inam et al. | |
| 2020/0019182 A1 | 1/2020 | Ling et al. | |
| 2020/0162582 A1 | 5/2020 | McCarthy et al. | |
| 2020/0204401 A1 | 6/2020 | Wei et al. | |
| 2020/0244582 A1 | 7/2020 | Li et al. | |
| 2020/0244588 A1 | 7/2020 | Filsfils et al. | |
| 2020/0252838 A1 | 8/2020 | Akdeniz et al. | |
| 2020/0389797 A1 | 12/2020 | Ashrafi | |
| 2020/0412635 A1 | 12/2020 | Jha et al. | |
| 2021/0111997 A1 | 4/2021 | Nainar et al. | |
| 2021/0120098 A1* | 4/2021 | Trichias | H04L 67/566 |
| 2021/0356279 A1* | 11/2021 | Szigeti | G01C 21/3407 |

FOREIGN PATENT DOCUMENTS

| | | |
|---|---|---|
| CN | 106559340 | 4/2017 |
| CN | 109417567 | 3/2019 |
| CN | 108848032 B | 4/2021 |

OTHER PUBLICATIONS

Invitation to Pay Fees dtd Dec. 4, 2020 for Application PCT/US20/55399 "Centralized Path Computation for Information-Centric Networking", 13 Pages.
Office Action for U.S. Appl. No. 16/601,352, mailed on Sep. 10, 2021, Nainar, "Centralized Path Computation for Information-Centric Networking", 9 Pages.
Office Action for U.S. Appl. No. 16/601,352, mailed on Mar. 11, 2022, Nainer, "Centralized Path Computation for Information-Centric Networking", 10 pages.
International Preliminary Report on Patentability for PCT Application No. PCT/US20/55399, mailed Apr. 28, 2022, 12 pages.
Chinese Office Action mailed Mar. 30, 2023 for Chinese patent application No. 202080067025.7, a foreign counterpart of U.S. Pat. No. 11,483,238, 12 pages.
Chinese Office Action mailed Oct. 28, 2023 for Chinese Application No. 202080087025.7, a foreign counterpart to U.S. Pat. No. 11,483,238, 16 pages.
PCT Search Report and Written Opinion mailed Feb. 4, 2021 for PCT Application No. PCT/US20/55399, 20 pages.

* cited by examiner

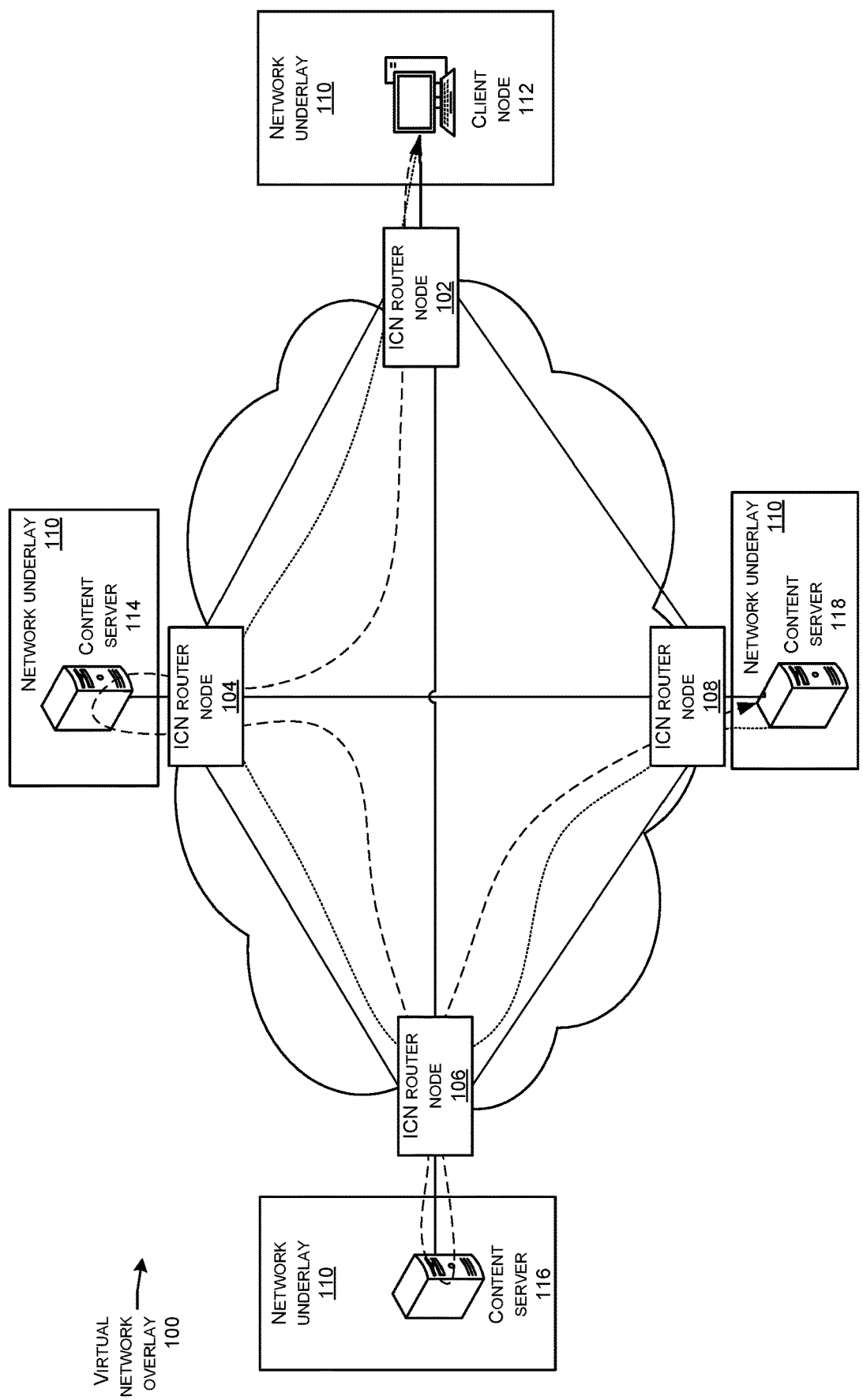

CENTRALIZED PATH COMPUTATION FOR INFORMATION-CENTRIC NETWORKING

RELATED APPLICATIONS

The present disclosure claims the benefit of and is a continuation of U.S. patent application Ser. No. 16/601,352 filed on Oct. 14, 2019 entitled "CENTRALIZED PATH COMPUTATION FOR INFORMATION-CENTRIC NETWORKING", which is hereby incorporated by reference in its entirety.

TECHNICAL FIELD

The present disclosure relates generally to improving path computation for routing in hybrid information-centric networking protocols.

BACKGROUND

Information-centric networking ("ICN") has been proposed as a network protocol which solves problems inherent in Internet Protocol ("IP")-based networking. Rather than clients communicating with hosts by IP address, under ICN, clients request data by content name; clients send outgoing interest packets representing requests for named content to be fulfilled, and in turn these requests are fulfilled by nodes where the named content is cached. The requested data may be served from any network node where the requested content is cached, and thus communications are decoupled from connections between clients and hosts, and decoupled from data location.

ICN as proposed in theory takes the form of a total replacement of IP-based networking. However, such implementation is currently not feasible at scale since the Internet is foundationally implemented based on IP networking. Therefore, proposals have been set forth for implementing ICN functionality on top of existing IP-based networking infrastructure. Such proposals include, for example, Named Data Networking ("NDN") or Content-Centric Networking ("CCN"), wherein implementation of ICN is, in part, achieved by caching a Pending Interest Table ("PIT") at nodes. A PIT caches information about unfulfilled interest packets so that nodes receiving data packets matching the named content requested by some number of interest packets may return the data packets to the client(s) from which each request originated by an "interest path" delineated by the PITs.

However, the implementation of PIT does not inherently provide a mechanism for returning the data packets to the client(s) in this situation. This remains an open question, subject to additional constraints, such as storage capacity, scalability and latency, as well as the possibility that an interest path is suboptimal. Improved solutions to returning named data packets to the client(s) that requested them are desirable.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1 illustrates an example system-architectural diagram of cached routing information in an hICN-enabled network wherein the cached routing information delineates an interest path which is suboptimal for transport of requested named data.

DESCRIPTION OF EXAMPLE EMBODIMENTS

Overview

Figure 2A:
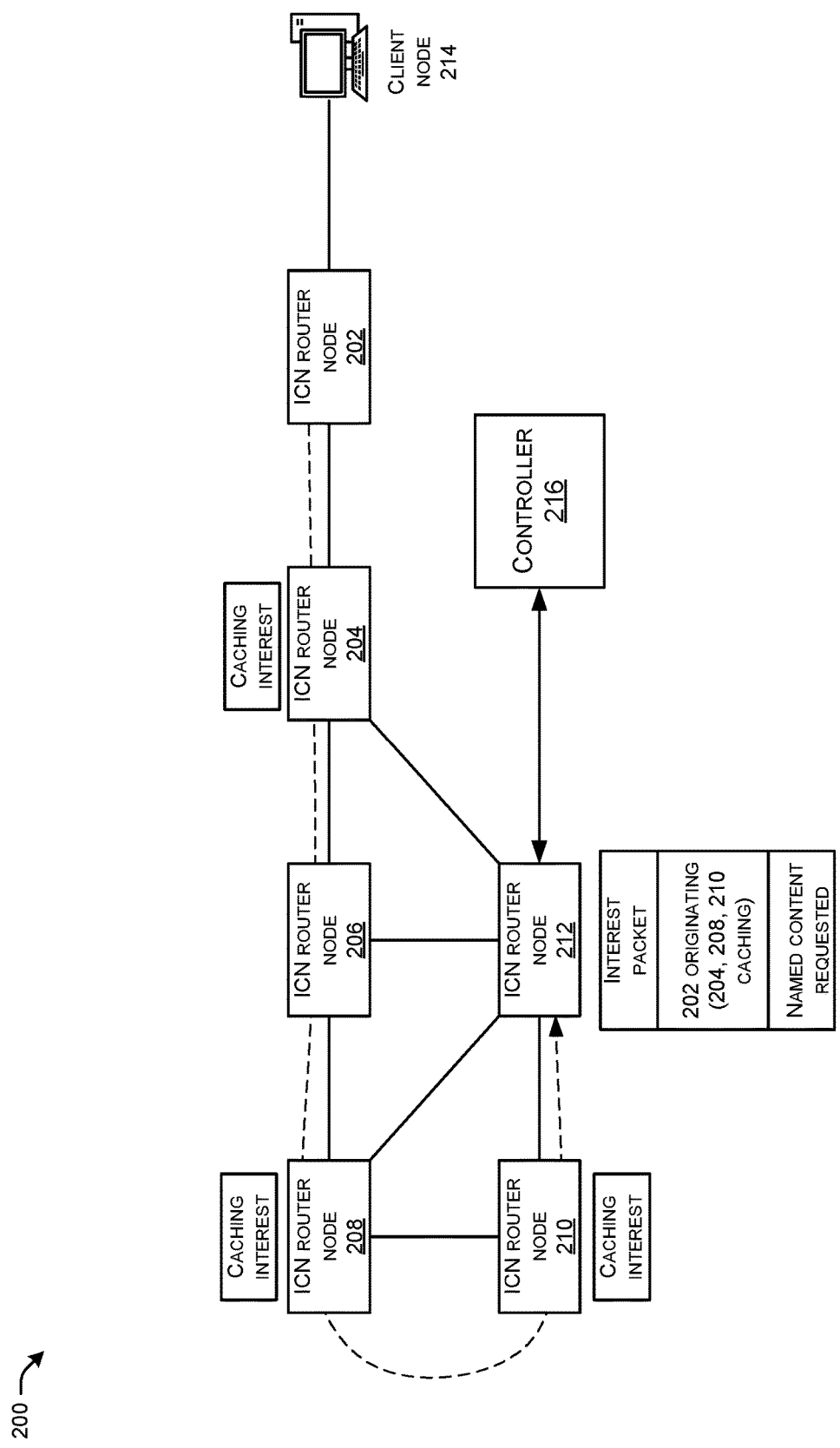
FIG. 2A illustrates a system-architecture diagram of an example hICN-enabled network in which a client node requests named data and a PCE computes paths for the requested named data.

This disclosure describes techniques for implementing centralized path computation for routing in hybrid information-centric networking protocols implemented as a virtual network overlay connecting traffic between content consumer client nodes and content producer and storage servers. A method includes receiving an interest packet header from a forwarding router node of a network overlay. The method further includes determining an interest path of the interest packet and one or more destination router nodes of the network overlay. The method further includes computing one or more paths over the network overlay. The method further includes determining an addressing method for the one or more computed paths over the network overlay. The method further includes performing at least one of encoding each computed path in a data packet header, and encoding each computed path as state entries of each router node of the network overlay on each respective path. The method further includes returning the computed path information to the forwarding router node.

Additionally, another method includes a first router node receiving an interest packet from a second router node of a network overlay, the interest packet being operative to request particular named content. The method further includes the first router node determining whether the second router node has caching interest for the requested named content. The method further includes the first router node determining whether the interest packet should be forwarded to more than one other router nodes of the network overlay. The method further includes the first router node inserting information entries into a header of the interest packet indicating the first router node being in an interest path of the interest packet; and forwarding the interest packet to one or more other router nodes of the network overlay.

Additionally, the techniques described herein may be performed by a system and/or device having non-transitory computer-readable media storing computer-executable instructions that, when executed by one or more processors, performs the methods described above.

Example Embodiments

The hybrid information-centric networking ("hICN") proposal for implementing ICN implements transportation of named data packets by providing an hICN-enabled network having ICN router nodes in addition to IP router nodes. Whereas IP router nodes are physical or virtual network nodes which implement at least conventional routing of IPv4 and IPv6 traffic consisting of data packets encapsulated by, for example, the TCP/IP stack headers, ICN router nodes are physical or virtual network nodes which implement at least routing of traffic encapsulated by, for example, ICN stack headers. As IP headers and ICN stack headers may be non-interoperable, ICN routers according to hICN may further implement routing for both data packets encapsulated by IP headers and data packets encapsulated by ICN headers, and may further implement mapping between IP addresses as specified by IP headers and content name as specified by ICN headers.

Implementations of hICN according to the present disclosure may provide a virtual network overlay over a network underlay. A network underlay is a physical or virtual network having any number of physical and/or virtual nodes forming a network topology. A network underlay may include any number of IP router nodes as described above, which may support suitable IP routing algorithms. According to examples of the present disclosure, IP routing algorithms may include segment routing algorithms, which may include at least one of Segment Routing over Multiprotocol Label Switching ("SR-MPLS") and Segment Routing over IPv6 ("SRv6").

In contrast to conventional routing algorithms such as distance vector or link state, segment routing algorithms may be implemented by a central controller which computes a path for a data packet through a network, then writes path information into the data packet such that router nodes of the network may forward the data packet based on the path information, rather than router nodes of the network incrementally computing the path for the data packet. The central controller which computes the path may be, for example, a Path Computation Element ("PCE").

A PCE as a network element may be a physical or virtual node of a network, a physical or virtual computing system connected to the network, a service running on a physical or virtual computing node of the network, or any other dedicated computing system or service accessible by nodes of the network. A node of the network accessing the PCE may act as a Path Computation Client ("PCC"). Acting independently from PCCs, a PCE may determine, for a data packet originating from a source node and destined for a destination node both in the network, an end-to-end path from the source node to the destination node.

According to implementations of SR-MPLS, path information may be written into the data packet as a stack of labels. According to implementations of SRv6, path information may be written into the data packet as an IPv6 header format, such as a Segment Routing Header ("SRH").

Elements of a PCE may include a physical or virtual computation module operative to compute, by any suitable pathfinding algorithm as known to persons skilled in the art and based on topology of the network layer wherein the PCE resides, an end-to-end path from a source node of a data packet to a destination node of the data packet as described above; a database operative to store and update information regarding topology of the network layer; and a communication module operative to receive information regarding topology of the network layer. Modules of the PCE may be computer-executable instructions stored in one or more physical and/or virtual non-transitory computer-readable media of the PCE and executable by one or more physical and/or virtual processor(s) of the PCE to perform their respective functions.

A database of a PCE may be referred to as, for example, a Traffic Engineering Database ("TED"). A PCE may update a TED upon receiving information such as topology information, resource information such as bandwidth capacity and availability, metrics for traffic engineering, and other types of information from individual network nodes or from other sources of information.

The implementation of ICN routers may establish a virtual network overlay, which providers virtual nodes connected by a virtual network topology over nodes making up the network underlay. ICN routers may be mapped to logical interfaces of router nodes of the physical network, and may not correspond directly to router nodes of the physical network. Thus, a hICN-enabled network may have a network overlay topology different form that of the network underlay topology.

According to proposals for ICN routing, rather than employ algorithmic path computation at a router or at a node such as a PCE, routing of named content may instead be performed based on cached information. One aspect of cache-based routing according to ICN routing implementations is for ICN router nodes to, while forwarding outbound interest packets from a requesting client, cache pointers to the direction in the network topology from which the interest packet was received. A Pending Interest Table ("PIT") may be cached at each ICN router node which receives an interest packet and forwards it onward. A PIT caches state entries pointing to client(s) from which unfulfilled interest packets were forwarded. Additional data structures such as a Forwarding Information Base ("FIB"), which may store interface (port) identifiers for each reachable network node for routing purposes, may also be cached at each ICN router node.

Another aspect of cache-based routing according to ICN routing implementations is that ICN router nodes may be interested or not interested in caching local copies of named content. Criteria for ICN router nodes having caching interest or not having caching interest may be specified according to various criteria according to ICN routing proposals, including, for example, according to names of named content and/or according to local storage capacity or availability of the ICN router nodes. Specifics of such criteria shall need not be reiterated herein. For the purpose of the present disclosure, it should merely be understood that an ICN router node has or does not have caching interest in caching a local copy of any given named content.

Interest packets may ultimately arrive at a content server, which may store or generate named content which satisfies the request of the interest packets. Data packets containing the named content may be returned to the client node over the hICN-enabled network, in which router nodes receiving data packets may match the data packets to requested named content cached at the PIT, and thereby may return the data packets in the direction(s) of the client(s) from which each request originated. State entries in the PITs therefore delineate "interest paths" for routing named content without algorithmic path computation.

In addition to PITs, named content sent by a content server over the hICN-enabled network may be cached at various ICN router nodes thereof to increase availability of the named content and reduce latency in requesting the named content, since retrieving the named content from a cache would be faster than retrieving it from the content server. However, cached named content needs to advertise its availability to client requesting content. One proposed methodology is so-called "breadcrumb" routing, a designation for caching-based routing wherein a data packet routed to a network node causes a "trail," referring to information pointing to nodes from which the data packet was routed and pointing to nodes to which the data packet will be routed, to be cached at the node, so that subsequent interest packets requesting for the same named content may be forwarded by searches following the cached "trails" to arrive at nodes where the named content is ultimately located. Thus, transport of named content over an hICN-enabled network may cause information regarding additional paths to be cached at ICN router nodes, enabling off-path routing for routing requests for named content without algorithmic path computation.

Cached routing information as described herein, including state entries in PITs delineating interest paths and including breadcrumb trails, may be limited to paths actually taken by data packets, while omitting information regarding alternative paths that data packets did not take. FIG. 1 illustrates an example system-architectural diagram of cached routing information in an hICN-enabled network wherein the cached routing information delineates an interest path which is suboptimal for transport of requested named data. As FIG. 1 illustrates, over a virtual network overlay 100, the overlay topology may include a first ICN router node 102, a second ICN router node 104, a third ICN router node 106, and a fourth ICN router node 108. Each of the ICN router nodes 102 to 108 may have a connection to each other, and each may serve as an ingress router for nodes outside the network overlay 100 and may serve as an egress router for data over the network overlay 100. Each such connection is illustrated in solid lines in FIG. 1.

The network overlay 100 may carry traffic originating from nodes of a network underlay 110, including interest packets and data packets making up named content requested by interest packets. In the network underlay 110, a client node 112 may send interest packets requesting certain named content through a connection to the network overlay 100. The network underlay 110 also includes a first content server 114, a second content server 116, and a third content server 118, where each content server may store and/or generate various named content, which may or may not include the named content requested by the client node 112. The second ICN router node 104 may map to a logical interface of the first content server 114. The third ICN router node 106 may map to a logical interface of the second content server 116. The fourth ICN router node 108 may map to a logical interface of the third content server 118.

In the example illustrated by FIG. 1, the client node 112 may connect to the network overlay 100 through the first ICN router node 102 as an ingress router. The client node 112 may send interest packets over the network overlay 100 to discover which of the content servers have the named content requested by the interest packets. Interest packets sent by the client node 112 may be forwarded by the first ICN router node 102 to the other ICN router nodes, though not to all other ICN router nodes.

Persons skilled in the art generally recognize that broadcasting of interest packets (that is, addressing interest packets to all nodes in the network) is undesirable due to likelihood of causing network congestion and disruption, and thus a variety of proposals exist for selective forwarding of interest packets over ICN-enabled networks, which need not be reiterated herein. For the purpose of the present disclosure, it should merely be understood that forwarding of interest packets from an ICN router node is generally selective, without regard as to any particular criteria for such selective forwarding (such as, for example, according to names of named content).

In the example illustrated by FIG. 1, the first ICN router node 102 forwards an interest packet to the second ICN router node 104, and does not forward the interest packet to the third ICN router node 106 or the fourth ICN router node 108. The second ICN router node 104 receives the interest packet, then determines that named content requested by the interest packet is not stored or generated at the first content server 114 and is not cached at the second ICN router node 104. The second ICN router node 104 may decide to cache the requested named content upon its arrival at the second ICN router node 104, or may decide not to cache the requested named content (based on, for example, local cache policy, local resource capacity, and the like). Regardless, the second ICN router node 104 then forwards the interest packet to the third ICN router node 106, and does not forward the interest packet to the fourth ICN router node 108. The second ICN router node 104 also updates a locally cached PIT to indicate that the interest packet requesting the named content was forwarded from the first ICN router node 102 and forwarded to the third ICN router node 106, thus caching interest path information for subsequently arriving data packets.

The third ICN router node 106 receives the interest packet, then determines that named content requested by the interest packet is not stored or generated at the second content server 116 and is not cached at the third ICN router 106. The third ICN router node 106 may decide to cache the requested named content upon its arrival at the third ICN router node 106, or may decide not to cache the requested named content (based on, for example, local cache policy, local resource capacity, and the like). Regardless, the third ICN router node 106 then forwards the interest packet to the fourth ICN router node 108. The third ICN router node 106 also updates a locally cached PIT to indicate that the interest packet requesting the named content was forwarded from the second ICN router node 104 and forwarded to the fourth ICN router node 108.

The fourth ICN router node 108 receives the interest packet, then determines that named content requested by the interest packet is stored or is generated at the third content server 118, or is cached at the fourth ICN router node 108. The fourth ICN router node 108 returns data packets of the requested named content to the third ICN router node 106 from which it received the interest packet along the interest path as cached at each ICN router node, as illustrated in FIG. 1 by a broken line pointing to the fourth ICN router node 108. As FIG. 1 illustrates, the network overlay 100 provides a connection between the fourth ICN router node 108 and the first ICN router node 102. Moreover, in the network underlay 110, the fourth ICN router node 108 may be physically nearer the first ICN router node 102 than any of the other router nodes are physically to the first ICN router node 102. However, due to the interest path of the interest packet pointing back at each ICN router node towards the previous ICN router node that forwarded the interest packet thereto, the fourth ICN router node 108 does not have knowledge that the interest packet initially originated from the first ICN router node 102. Thus, ICN router nodes, by cached routing information, may return requested named content to requesting client nodes by a suboptimal path, as illustrated in FIG. 1 by a broken line pointing to the client node 112.

Therefore, according to examples of the present disclosure, to further improve routing performance and transport of data packets in hICN-enabled networks, routing of data packets may be performed according to both cached routing information and algorithmic path computation. Path computation may be performed by any suitable computing system acting as a central controller such as, for example, a PCE as utilized in implementing routing methodologies such as MPLS and SRv6. Path computation may be performed based on at least knowledge of the network overlay topology, and may further be performed based on knowledge of the network underlay topology.

Knowledge of the network overlay topology and knowledge of the network underlay topology may be stored in a database, such as a TED, of the PCE. Such information may be advertised by an implementation of Border Gateway Protocol ("BGP"), that is, one of various gateway protocols which cause network topology information to be advertised as, for example, Network Layer Reachability Information ("NLRI"). The advertisement of NLRI may be performed by the PCE peering with individual ICN nodes by Interior Gateway Protocol ("IGP"), or, according to implementations such as Border Gateway Protocol-Link State ("BGP-LS"), may be performed by a router neighboring individual ICN nodes, such as a BGP Speaker, communicating with the PCE. The PCE may receive NLRI through a communication module of the PCE, and may build and update the database using received NLRI.

According to examples of the present disclosure, interest packet headers according to hICN-enabled network implementations may include information regarding ICN router nodes along the interest path of the interest packet. Such information may further include information regarding caching interest of each such ICN router node for various named content. Such information may be carried in a header format, such as a Type-Length-Value ("TLV") format, according to data packet encapsulation as implemented on the hICN-enabled network. TLV may generally refer to any encoding format which encodes a value for a particular type of field, where the type of the field is encoded in a type field, the length of the value is encoded in a length field, and the value is encoded in a value field.

For example, for an hICN-enabled network according to an example implementation of CCN as defined by RFC 8609, header TLVs may include hop-by-hop header TLVs, which may encode information regarding intermediate ICN router nodes along the interest path of the interest packet, and may include information regarding caching interest of those intermediate ICN router nodes.

Alternatively, header TLVs may be formatted according to various proposed extension TLVs to IPv6 headers, such as, for example, TLVs defined by the In-Band Operations, Administration, and Maintenance ("iOAM") protocol from CISCO SYSTEMS INC. of San Jose, California. In general, information entries as described herein may be formatted according to any packet encapsulation format which enables entry of information regarding nodes along a path of the packet, and enables such entries to be updated on a per-hop basis by each node that the packet is forwarded over.

According to examples of the present disclosure, an ICN router node may insert information entries into headers of received interest packets prior to forwarding those interest packets. These information entries may include information, in a defined format such as a TLV format as described above, indicating the ICN router node being in the interest path of the interest packet and indicating caching interest of the ICN router node for named content requested by the interest packet.

For example, an ICN router node may insert such information entries into a header of a received interest packet in the case that the ICN router node has caching interest for the requested named content.

Furthermore, an ICN router node may insert such information entries into a header of a received interest packet in the case that the ICN router node will forward the interest packet to more than one other ICN router node.

Such information entries, upon being forwarded as part of an interest packet by an ICN router having the requested named content to a PCE of the hICN-enabled network, may enable the PCE to perform any or all of the following path computations for the interest packet:

Whether there is an end-to-end path from the ICN router node having the named content requested by the interest packet to a requesting client node which is more optimal than an interest path of the interest packet, and if so, computing the end-to-end path;

Whether there are end-to-end paths from the ICN router node having the requested named content to other ICN routers having interest for caching the named content which are more optimal than the interest path, not redundant to the end-to-end path to the requesting client node, and not redundant to each other, and if so, computing each such end-to-end-path; and Whether unicast addressing or multicast addressing is more optimal for transporting the named content on each end-to-end path computed as described above.

FIG. 2A illustrates a system-architecture diagram of an example hICN-enabled network 200 in which a client node requests named data and a PCE computes paths for the requested named data.

As FIG. 2A illustrates, over a virtual network overlay, the overlay topology may include a first ICN router node 202, a second ICN router node 204, a third ICN router node 206, a fourth ICN router node 208, a fifth ICN router node 210, and a sixth ICN router node 212. Connections among the ICN router nodes may include, as illustrated, a connection between the first ICN router node 202 and the second ICN router node 204, a connection between the second ICN router node 204 and the third ICN router node 206, a connection between the second ICN router node 204 and the sixth ICN router node 212, a connection between the third ICN router node 206 and the fourth ICN router node 208, a connection between the third ICN router node 206 and the sixth ICN router node 212, a connection between the fourth ICN router node 208 and the fifth ICN router node 210, a connection between the fourth ICN router node 208 and the sixth ICN router node 212, and a connection between the fifth ICN router node 210 and the sixth ICN router node 212. Each such connection is illustrated in solid lines in FIG. 2A. Each ICN router node may serve as an ingress router for nodes outside the network overlay and may serve as an egress router for data over the network overlay. Any number of the ICN router nodes may map to respective logical interfaces of content servers which may store and/or generate various named content.

A client node 214 may connect to the network overlay through the first ICN router node 202 as an ingress router. The client node 214 may send interest packets over the network overlay to request certain named content. Interest packets sent by the client node 214 may be forwarded by the first ICN router node 202 to the other ICN router nodes through available connections in the overlay topology as described above.

In the example illustrated by FIG. 2A, the first ICN router node 202 does not have caching interest for named content requested by the interest packet, and the first ICN router node 202 can only forward the interest packet to the second ICN router node 204. Therefore, the first ICN router node 202 forwards an interest packet to the second ICN router node 204 without inserting information entries in the header of the interest packet.

The second ICN router node 204 receives the interest packet, then determines that named content requested by the interest packet is not available at the second ICN router node 204 (i.e., not stored or generated at a corresponding content server, not cached locally, and the like). However, the second ICN router node 204 has caching interest for the requested named content (due to, for example, local cache policy, local resource capacity or availability, and the like). Therefore, the second ICN router node 204 inserts information entries in the header of the interest packet indicating the second ICN router node 204 being in an interest path of the interest packet and indicating caching interest of the second ICN router node 204 for named content requested by the interest packet. The second ICN router node 204 then forwards the interest packet to the third ICN router node 206. The second ICN router node 204 also updates a locally cached PIT to indicate that the interest packet requesting the named content was forwarded from the first ICN router node 202 and forwarded to the third ICN router node 206, thus caching interest path information for subsequently arriving data packets. However, the second ICN router node 204 does not forward the interest packet to the sixth ICN router node 212 (due to, for example, bandwidth capacity or availability or other metric, or policy information).

The third ICN router node 206 receives the interest packet, then determines that named content requested by the interest packet is not stored or generated at the third ICN router 106 (i.e., not stored or generated at a corresponding content server, not cached locally, and the like). The third ICN router 206 also does not have caching interest for the requested named content (due to, for example, local cache policy, local resource capacity or availability, and the like). The third ICN router 206 also determines that it will not forward the interest packet to multiple receiving nodes (due to, for example, bandwidth capacity or availability, or other metric or policy information). Therefore, the third ICN router node 206 does not insert information entries in the header of the interest packet. The third ICN router node 206 then forwards the interest packet to the fourth ICN router node 208. The third ICN router node 206 also updates a locally cached PIT to indicate that the interest packet requesting the named content was forwarded from the second ICN router node 204 and forwarded to the fourth ICN router node 208. However, the third ICN router node 206 does not forward the interest packet to the sixth ICN router node 212 (due to, for example, bandwidth capacity or availability, or other metric or policy information).

The fourth ICN router node 208 receives the interest packet, then determines that named content requested by the interest packet is not available at the fourth ICN router node 208 (i.e., not stored or generated at a corresponding content server, not cached locally, and the like). However, the fourth ICN router node 208 has caching interest for the requested named content (due to, for example, local cache policy, local resource capacity or availability, and the like). Therefore, the fourth ICN router node 208 inserts information entries in the header of the interest packet indicating the fourth ICN router node 208 being in an interest path of the interest packet and indicating caching interest of the fourth ICN router node 208 for named content requested by the interest packet. The fourth ICN router node 208 then forwards the interest packet to the fifth ICN router node 210. The fourth ICN router node 208 also updates a locally cached PIT to indicate that the interest packet requesting the named content was forwarded from the third ICN router node 206 and forwarded to the fifth ICN router node 210, thus caching interest path information for subsequently arriving data packets. However, the fourth ICN router node 208 does not forward the interest packet to the sixth ICN router node 212 (due to, for example, bandwidth capacity or availability or other metric, or policy information).

The fifth ICN router node 210 receives the interest packet, then determines that named content requested by the interest packet is not available at the fifth ICN router node 210 (i.e., not stored or generated at a corresponding content server, not cached locally, and the like). However, the fifth ICN router node 210 has caching interest for the requested named content (due to, for example, local cache policy, local resource capacity or availability, and the like). Therefore, the fifth ICN router node 210 inserts information entries in the header of the interest packet indicating the fifth ICN router node 210 being in an interest path of the interest packet and indicating caching interest of the fifth ICN router node 210 for named content requested by the interest packet. The fifth ICN router node 210 then forwards the interest packet to the sixth ICN router node 212. The fifth ICN router node 210 also updates a locally cached PIT to indicate that the interest packet requesting the named content was forwarded from the fourth ICN router node 208 and forwarded to the sixth ICN router node 212, thus caching interest path information for subsequently arriving data packets.

The sixth ICN router node 212 receives the interest packet, then determines that named content requested by the interest packet is stored or is generated at a corresponding content server, or is cached at the sixth ICN router node 212. The sixth ICN router node 212 forwards the interest packet to a central controller 216 of the network overlay, such as a PCE, to request the controller 216 to compute one or more paths for the interest packet.

The controller 216 may compute an end-to-end path from the sixth ICN router node 212 to the first ICN router node 202 in the event that the controller 216 determines that there is an end-to-end path more optimal than an interest path of the interest packet. In this case, the interest path of the interest packet would cause the named content to be returned over, in sequence, the sixth ICN router node 212; the fifth ICN router node 210; the fourth ICN router node 208; the third ICN router node 206; the second ICN router node 204; and the first ICN router node 202, i.e., the interest packet would arrive in five hops. The controller 216 may determine that, on a more optimal path from the sixth ICN router node 212 to the first ICN router node 202, the named content would be returned over, in sequence, the sixth ICN router node 212; the second ICN router node 204; and the first ICN router node 202, by knowledge of the connection between the second ICN router node 204 and the sixth ICN router node 212, which may be discerned from at least overlay topology information and optionally underlay topology information stored in a database, such as a TED, of the controller 216. By this more optimal path, the named content may be returned to the client node 214 by three hops rather than five hops, while also being cached at a node having caching interest.

Additionally, the controller 216 may determine from information entries in the header of the interest packet that the second ICN router node 204, the fourth ICN router node 208, and the fifth ICN router node 210 each has caching interest in the requested named content. The controller 216 may determine that there is no path from the sixth ICN router node 212 to the second ICN router node 204 more optimal than the path determined above to the first ICN router node 202. The controller 216 may further determine that, on a path from the sixth ICN router node 212 over the fifth ICN router node 210 and the fourth ICN router node 208, the named content would be returned to both the fourth ICN router node 208 and the fifth ICN router node 210, both of which have caching interest for the named content. By this more optimal path, the named content may be cached at two nodes having caching interest.

Figure 2B:
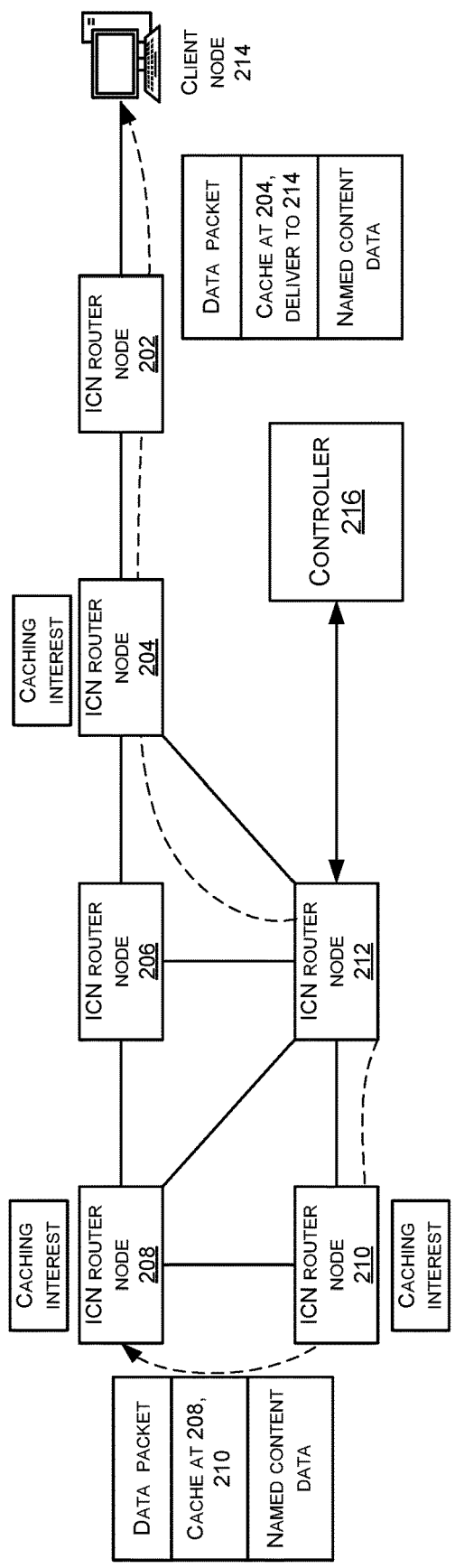
FIG. 2B illustrates the system-architecture diagram of FIG. 2B with each of these computed paths shown in broken lines.

Thus, the controller 216 determines, for the named content, a first path to the first ICN router node 202 and to the second ICN router node 204, and a second path to the fourth ICN router 208 and the fifth ICN router 210. Each of these respective paths is more optimal than the interest path for its respective destinations; more optimal than each of the other paths for its respective destinations; and, together, these paths are not redundant to each other for their respective destinations (i.e., no path encompasses the destinations of any of the other paths). FIG. 2B illustrates the system-architecture diagram of FIG. 2A with each of these computed paths shown in broken lines.

Additionally, the controller 216 may determine that multicast addressing is more optimal than unicast addressing for transporting the named content over each of the paths computed as described above. Since the named content will be forwarded to two different destinations from the sixth ICN router node 212, multicast addressing for data packets of the named content to each of these two destinations may be more optimal than unicast addressing of data packets to a single destination at a time.

The controller 216 may encode each computed path in a header according to a suitable encapsulation format as implemented for the hICN-enabled network. For example, for an hICN-enabled network implementing MPLS, a computed path may be encoded as a stack of labels. For an hICN-enabled network implementing SRv6, a computed path may be encoded as segment information in a SRH header. The encoded information may further include addressing according to an addressing method as described above.

Alternatively, or additionally, the controller 216 may encode each computed path as state entries in PITs and FIBs of each ICN router node on each respective path. These state entries may modify interest path information in the existing state entries in the respective PITs and FIBs. For example, since state entries of the PITs and FIBs of the fourth ICN router node 208 previously referenced an interest path pointing back to the third ICN router node 206, the controller 216 may remove these state entries so that data packets forwarded to the fourth ICN router node 208 according to the computed paths are not forwarded on to the third ICN router node 206.

Thus, the controller 216 returns the computed path information to the sixth ICN router node 212. The sixth ICN router node 212 may forward one copy of the data packets of the requested named content to each next-hop destination from the sixth ICN router node 212 as encoded in the computed path information. In this case, the sixth ICN router node 212 forwards one copy of the data packets to the second ICN router node 204 and another copy of the data packets to the fifth ICN router node 210. The first copy of the data packets will be cached at the second ICN router node 204, and forwarded on by the second ICN router node 204 in accordance with path information encoded in the header and/or updated local PIT/FIB routing information to the first ICN router node 202, where the data packets are received by the client node 214. The second copy of the data packets will be cached at the fifth ICN router node 210, and forwarded on by the fifth ICN router node 210 in accordance with path information encoded in the header and/or updated local PIT/FIB routing information to the fourth ICN router node 208, where the data packets are cached at the fourth ICN router node 208 and not forwarded on further.

Figure 3:
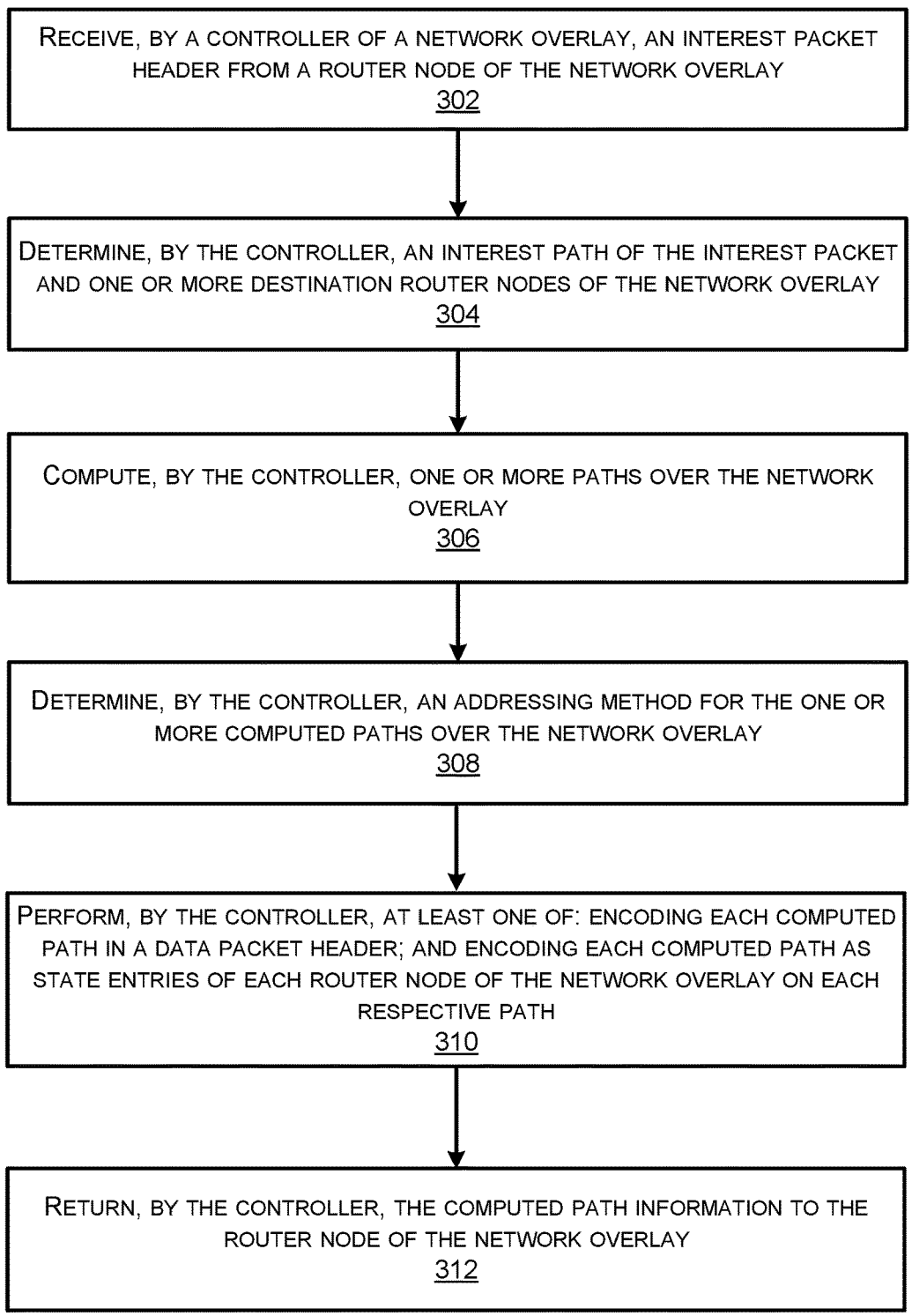
FIG. 3 illustrates a flow diagram of an example method for computing paths for named content in an hICN-enabled network based on network topology and interest information.

FIG. 3 illustrates a flow diagram of an example method 300 for computing paths for named content in an hICN-enabled network based on network topology and interest information. The method may be executing on one or more processors of a central controller of a virtual network overlay logically defined over a network underlay. The controller may include one or more processors and one or more non-transitory computer-readable media storing computer-executable instructions that, when executed by the one or more processors, cause the one or more processors to perform the method 300. A controller may be, for example, a PCE consistent with the present disclosure as described above.

At 302, a controller of a network overlay receives an interest packet header from a router node of the network overlay. As illustrated by FIG. 2A, step 302 may be performed after the sixth ICN router node 212 receives the interest packet and forwards the interest packet to the controller 216. In examples of the present disclosure where the controller is a PCE, the router node may communicate with the PCE as a PCC according to any suitable protocol for PCE-PCC communications.

The received interest packet may originate from a client node outside the network overlay requesting certain named content which is stored at, generated at, cached at, or otherwise available at the router node to forward to the client node over the network overlay. The received interest packet header may include information entries regarding router nodes along the interest path of the interest packet, and may further include information entries regarding caching interest of each such router node for various named content, in accordance with the present disclosure as described above.

At 304, the controller determines an interest path of the interest packet and one or more destination router nodes of the network overlay. The one or more destination router nodes of the network overlay includes an originating router node of the network overlay from which the interest path originates. The one or more destination router nodes of the network overlay may further include one or more other caching router node(s) of the network overlay having caching interest for named content requested by the interest packet. Each of these determinations may be made based on information entries of the interest packet header as described above.

At 306, the controller computes one or more paths over the network overlay, the one or more paths non-redundantly encompassing each of the one or more destination router nodes, and the one or more paths each being no less optimal than the interest path according to at least topology of the network overlay. Non-redundantly encompassing each of the above-mentioned router nodes may mean that among all of the one or more paths, each of the above-mentioned router nodes is included in only one path and included only one time. A path being no less optimal than the interest path according to at least topology of the network overlay may mean the path includes no more hops than the interest path over nodes of the network overlay. The path may further be more optimal than the interest path according to topology of the network overlay, meaning the path includes fewer hops than the interest path. Optimality may be determined by topology and metrics regarding router nodes of the network overlay, which may be built and updated in manners according to the present disclosure as described above. Moreover, optimality may further be determined by topology and metrics regarding nodes of the network underlay which correspond to the nodes of the network underlay, which may be built and updated in manners according to the present disclosure as described above. For example, proximity of nodes of the network underlay, topological connections of the network underlay, bandwidth capacity and availability of connections of the network underlay, and the like may be considered in conjunction with topology of the network overlay.

At 308, the controller determines an addressing method for the one or more computed paths over the network overlay. An addressing method may be selected from known addressing methods supported by IP networking, ICN networking, and such networking protocols. For example, an addressing method may be selected from unicast addressing, multicast addressing, broadcast addressing, and the like. A most appropriate or optimal addressing method may be selected depending on the number of paths computed, the comparative topologies of those paths, and such factors. For example, if a single path is computed for all destination router nodes, unicast addressing may be more appropriate than multicast addressing; if multiple paths are computed, multicast addressing may be more appropriate than unicast addressing.

At 310, the controller performs at least one of:

Encoding each computed path in a data packet header; and

Encoding each computed path as state entries of each router node of the network overlay on each respective path.

Each type of encoding may be performed according to formats of examples of the present disclosure as described above.

At 312, the controller returns the computed path information to the router node of the network overlay. The router node, and other router nodes of the network overlay, may then route data packets of the requested named content according to the computed path information.

Figure 4:
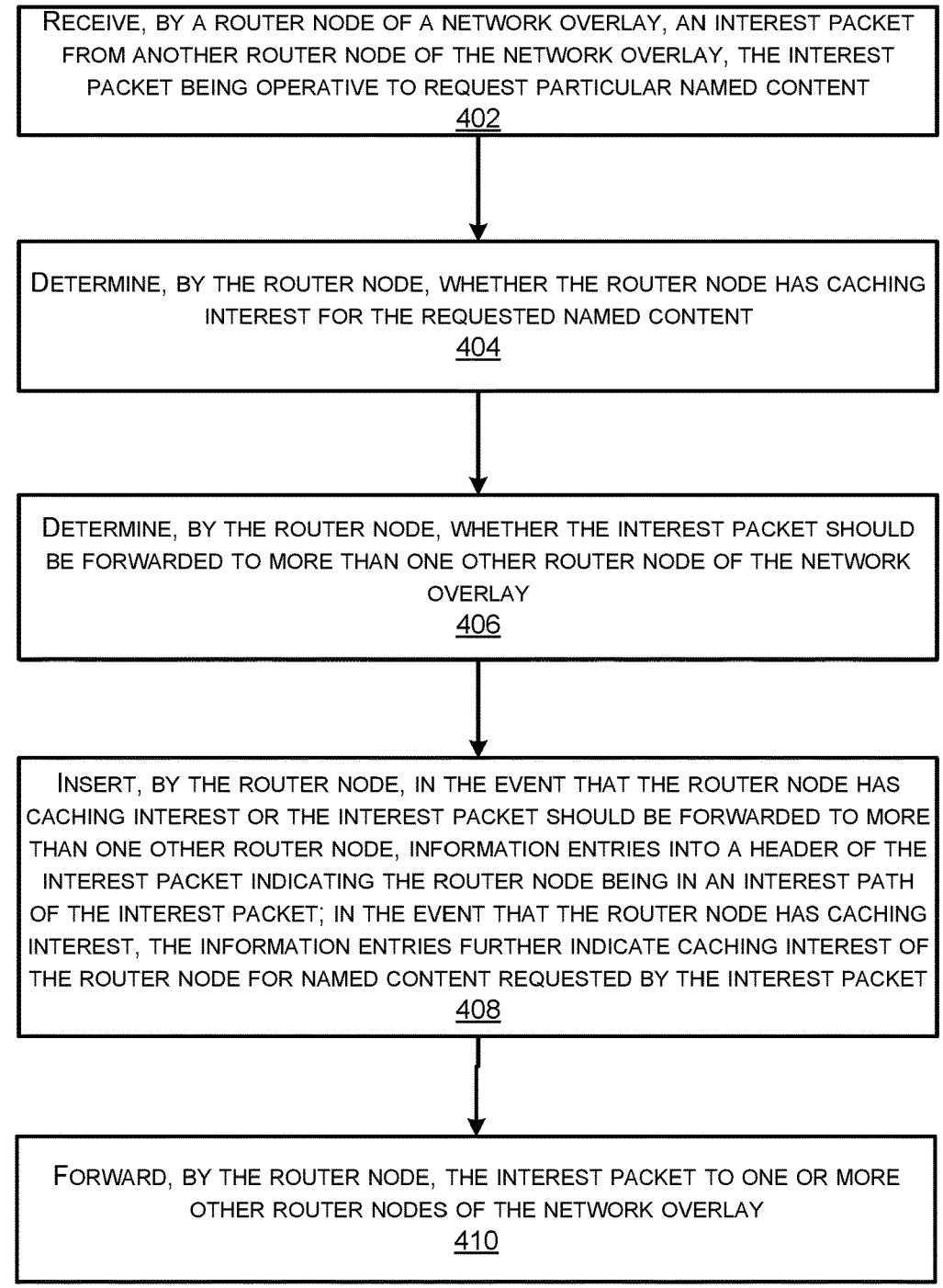
FIG. 4 illustrates a flow diagram of an example method for handling interest packet routing by router nodes in an hICN-enabled network.

FIG. 4 illustrates a flow diagram of an example method 400 for handling interest packet routing by router nodes in an hICN-enabled network. The method may be executing on one or more processors of a router node of a virtual network overlay logically defined over a network underlay. The controller may include one or more processors and one or more non-transitory computer-readable media storing computer-executable instructions that, when executed by the one or more processors, cause the one or more processors to perform the method 400.

At 402, a router node of a network overlay receives an interest packet from another router node of the network overlay. The interest packet may be operative to request particular named content. A header of the interest packet may have a format which supports information entries indicating particular router nodes of the network overlay being in the interest path of the interest packet and indicating caching interest of particular router nodes of the network overlay for the requested named content.

At 404, the router node determines whether the router node has caching interest for the requested named content (based on, for example, local cache policy, local resource capacity, and the like).

At 406, the router node determines whether the interest packet should be forwarded to more than one other router node of the network overlay. As described above, it should merely be understood that forwarding of interest packets from an ICN router node is generally selective, without regard as to any particular criteria for such selective forwarding.

At 408, in the event that the router node has caching interest or the interest packet should be forwarded to more than one other router node, the router node inserts information entries into a header of the interest packet indicating the router node being in an interest path of the interest packet. In the event that the router node has caching interest, the information entries further indicate caching interest of the router node for named content requested by the interest packet.

At 410, the router node forwards the interest packet to one or more other router nodes of the network overlay.

Figure 5:
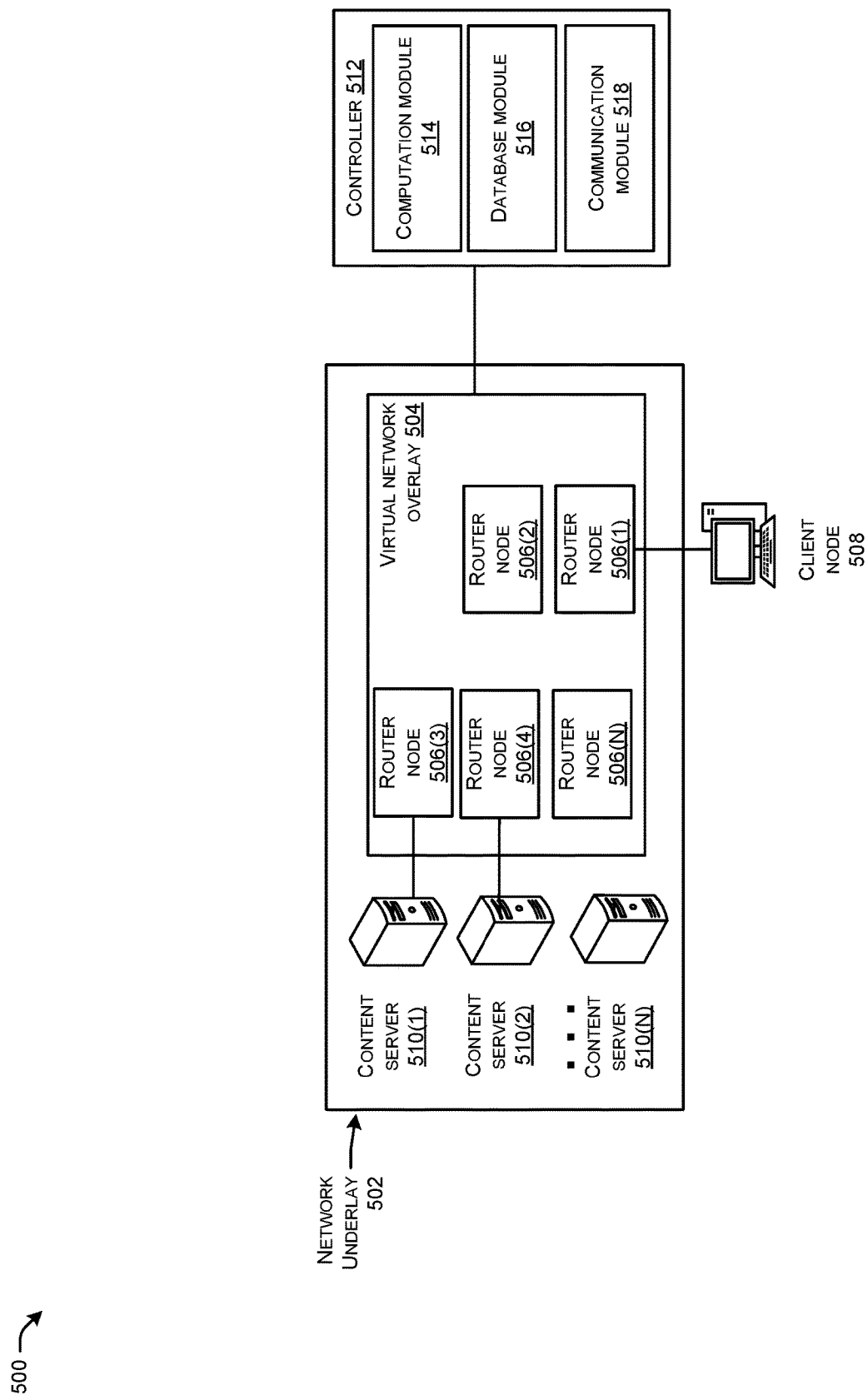
FIG. 5 is a computing system diagram illustrating a configuration for an hICN-enabled network in which a virtual network overlay established over a network underlay connects client nodes with content servers.

FIG. 5 is a computing system diagram illustrating a configuration for an hICN-enabled network 500 in which a virtual network overlay established over a network underlay connects client nodes with content servers.

Networking resources of an hICN-enabled network 500 may be a collection of physical nodes located across geographic areas forming a network underlay 502, over which a virtual network overlay 504 is logically defined. The network overlay 504 utilizes the resources of the network to implement a data plane topology interconnecting ICN router nodes 506(1)-506(N) where N is any integer greater than "1." The network overlay 504 may be a distributed network through which a user may connect, via a client node 508, to any of router nodes 506(1)-506(N) to request named content which may be stored and/or generated at any of the content servers 510(1)-510(N) where N is any integer greater than "1."

The hICN-enabled network 500 may provide, via the router node 506(1)-506(N) of the data plane topology, access to content servers 510(1)-510(N) hosted in the network underlay 502. In some examples, the hICN-enabled network 500 may be managed and maintained by a service provider hosting various services accessible on the hICN-enabled network 500 and defining various policies which govern use and availability of these services.

As described above, a controller 512 may be a physical or virtual node of the network underlay 502 or the network overlay 504, a physical or virtual computing system connected to the network underlay 502 or the network overlay 504, a service running on a physical or virtual computing node of the network underlay 502 or the network overlay 504, or any other dedicated computing system or service accessible by nodes of the network underlay 502 and/or the network overlay 504.

Elements of a controller 512 may include a physical or virtual computation module 514; a database 516; and a communication module 518 each as described above. Modules of the PCE may be computer-executable instructions stored in one or more physical and/or virtual non-transitory computer-readable media of the PCE and executable by one or more physical and/or virtual processor(s) of the PCE to perform their respective functions.

As described above, a database of a PCE may be a TED, which tracks information such as topology information, resource information such as bandwidth capacity and availability, metrics for traffic engineering, and other types of information from individual network nodes or from other sources of information.

In some instances, the network overlay 502 may provide computing resources, like VM instances and storage, on a permanent or an as-needed basis. Among other types of functionality, the computing resources provided by the network overlay 502 may be utilized to implement the various services described above. The computing resources provided by the virtual network overlay 502 can include various types of computing resources, such as data processing resources like VM instances, data storage resources, networking resources, data communication resources, network services, and the like.

Each type of computing resource provided by the network overlay 502 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The network overlay 502 can also be configured to provide other types of computing resources not mentioned specifically herein.

The computing resources provided by the network overlay 502 may be enabled in one embodiment by one or more servers located over a physical space to provide a hICN-enabled network as described above. The servers may be housed in spaces to operate computer systems and associated components, typically including redundant and backup power, communications, cooling, and security systems. The servers can also be located in geographically disparate locations.

Figure 6:
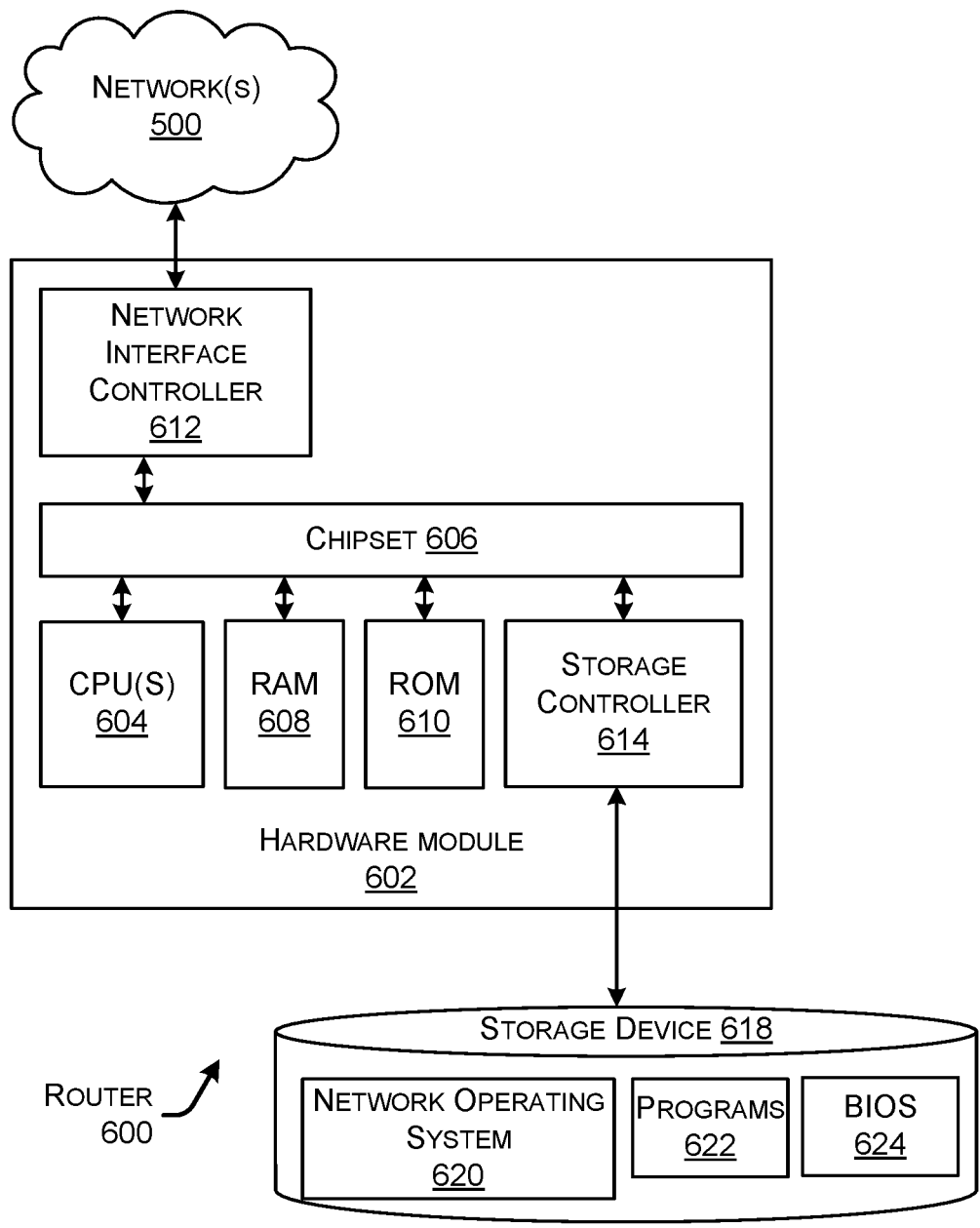
FIG. 6 shows an example computer architecture for a router capable of executing program components for implementing the functionality described herein.

FIG. 6 shows an example computer architecture for a router 600 capable of executing program components for implementing the functionality described above. The computer architecture shown in FIG. 6 illustrates a computing device assembled from modular components, and can be utilized to execute any of the software components presented herein. The router 600 may, in some examples, run or virtualize an ICN router node as described above.

One or more hardware modules 602 installed in a router 600 may be a physical card or module to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the hardware module 02.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the hardware module 602. The chipset 606 can provide an interface to a RAM 608, used as the main memory in the hardware module 602. The chipset 606 can further provide an interface to a computer-readable storage medium such as a read-only memory ("ROM") 610 or non-volatile RAM ("NVRAM") for storing basic routines that help to startup the hardware module 602 and to transfer information between the various components and devices. The ROM 610 or NVRAM can also store other software components necessary for the operation of the hardware module 602 in accordance with the configurations described herein.

The hardware module 602 can operate in a networked environment using logical connections to remote computing devices and computer systems through a network, such as the hICN-enabled network 500. The chipset 606 can include functionality for providing network connectivity through a NIC 612, such as a gigabit Ethernet adapter. The NIC 612 is capable of connecting the hardware module 602 to other computing devices over the network 608. It should be appreciated that multiple NICs 612 can be present in the hardware module 602, connecting the computer to other types of networks and remote computer systems.

The hardware module 602 can be connected to a storage device 618 that provides non-volatile storage for the hardware module 602. The storage device 618 can store an operating system 620, programs 622, a BIOS 624, and data, which have been described in greater detail herein. The storage device 618 can be connected to the hardware module 602 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The hardware module 602 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the hardware module 602 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The hardware module 602 can further read information from the storage device 618 by detecting the physical states or characteristics of one or more particular locations within the physical storage units.

In addition to the mass storage device 618 described above, the hardware module 602 can have access to other computer-readable storage media to store and retrieve information, such as program modules, data structures, or other data. It should be appreciated by those skilled in the art that computer-readable storage media is any available media that provides for the non-transitory storage of data and that can be accessed by the hardware module 602. In some examples, the operations performed by a router node of the network overlay, and or any components included therein, may be supported by one or more devices similar to the hardware module 602. Stated otherwise, some or all of the operations performed by a router node of the network overlay, and or any components included therein, may be performed by one or more hardware modules 600 operating in a networked, distributed arrangement over one or more logical fabric planes over one or more networks.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the hardware module 602. According to one embodiment, the operating system comprises the LINUX or NETBSD operating system and derivatives thereof. According to another embodiment, the operating system comprises the CISCO IOS operating system from CISCO SYSTEMS INC. of San Jose, California. It should be appreciated that other operating systems can also be utilized. The storage device 618 can store other system or application programs and data utilized by the hardware module 600.

In one embodiment, the storage device 618 or other computer-readable storage media is encoded with computer-executable instructions which, when loaded into a computer, transform the computer from a general-purpose computing system into a special-purpose computer capable of implementing the embodiments described herein. These computer-executable instructions transform the hardware module 602 by specifying how the CPUs 604 transition between states, as described above. According to one embodiment, the hardware module 602 has access to computer-readable storage media storing computer-executable instructions which, when executed by the hardware module 602, perform the various processes described above with regard to FIGS. 1-4. The hardware module 602 can also include computer-readable storage media having instructions stored thereupon for performing any of the other computer-implemented operations described herein.

Figure 7:
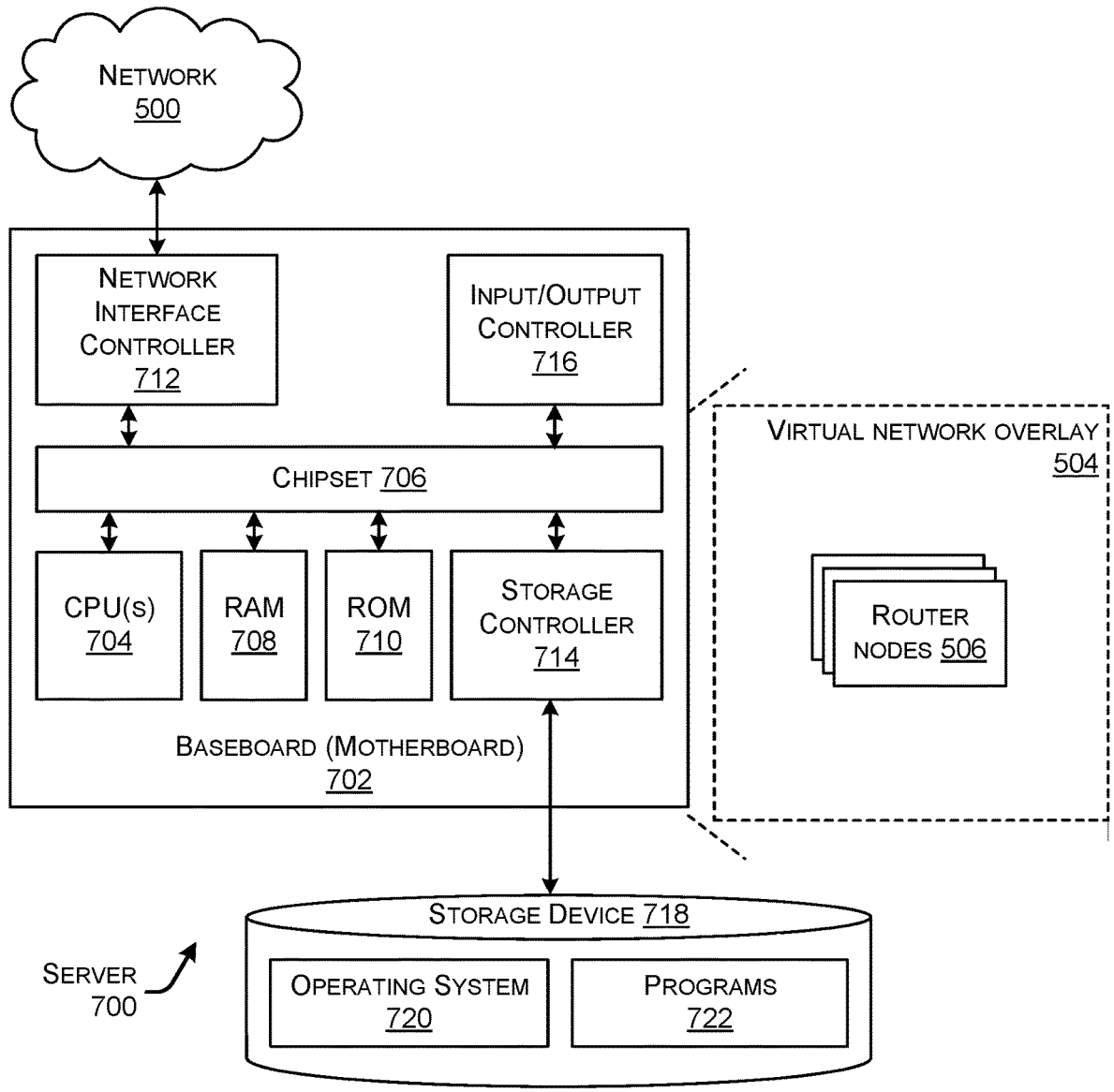
FIG. 7 shows an example computer architecture for a server capable of executing program components for implementing the functionality described herein.

FIG. 7 shows an example computer architecture for a server 700 capable of executing program components for implementing the functionality described above. The computer architecture shown in FIG. 7 illustrates a conventional server computer, workstation, network appliance, or other computing device, and can be utilized to execute any of the software components presented herein. The server 700 may, in some examples, correspond to a network node described herein.

The server 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the server 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the server 700. The chipset 706 can further provide an interface to a computer-readable storage medium such as a read-only memory ("ROM") 710 or non-volatile RAM ("NVRAM") for storing basic routines that help to startup the server 700 and to transfer information between the various components and devices. The ROM 710 or NVRAM can also store other software components necessary for the operation of the server 700 in accordance with the configurations described herein.

The server 700 can operate in a networked environment using logical connections to remote computing devices and computer systems through a network, such as the hICN-enabled network 500. The chipset 706 can include functionality for providing network connectivity through a NIC 712, such as a gigabit Ethernet adapter. The NIC 712 is capable of connecting the server 700 to other computing devices over the network 500. It should be appreciated that multiple NICs 712 can be present in the server 700, connecting the server node to other types of networks and remote computer systems.

The server 700 can be connected to a storage device 718 that provides non-volatile storage for the computer. The storage device 718 can store an operating system 720, programs 722, and data, which have been described in greater detail herein. The storage device 718 can be connected to the server 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server 700 can store data on the storage device 718 by transforming the physical state of the physical storage units to reflect the information being stored. The specific transformation of physical state can depend on various factors, in different embodiments of this description.

Examples of such factors can include, but are not limited to, the technology used to implement the physical storage units, whether the storage device 718 is characterized as primary or secondary storage, and the like.

For example, the server 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server 700 can further read information from the storage device 718 by detecting the physical states or characteristics of one or more particular locations within the physical storage units.

In addition to the mass storage device 718 described above, the server 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the server 700. In some examples, the operations performed by the virtual network overlay, and or any components included therein, may be supported by one or more devices similar to server 700. Stated otherwise, some or all of the operations performed by the virtual network overlay, and or any components included therein, may be performed by one or more server 700 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the server 700. According to one embodiment, the operating system comprises the LINUX operating system. According to another embodiment, the operating system comprises the WINDOWS® SERVER operating system from MICROSOFT Corporation of Redmond, Washington According to further embodiments, the operating system can comprise the UNIX operating system or one of its variants. It should be appreciated that other operating systems can also be utilized. The storage device 718 can store other system or application programs and data utilized by the server 700.

In one embodiment, the storage device 718 or other computer-readable storage media is encoded with computer-executable instructions which, when loaded into the server 700, transform the computer from a general-purpose computing system into a special-purpose computer capable of implementing the embodiments described herein. These computer-executable instructions transform the server 700 by specifying how the CPUs 704 transition between states, as described above. According to one embodiment, the server 700 has access to computer-readable storage media storing computer-executable instructions which, when executed by the server 700, perform the various processes described above with regard to FIGS. 1-4. The server 700 can also include computer-readable storage media having instructions stored thereupon for performing any of the other computer-implemented operations described herein.

The server 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the server 700 might not include all of the components shown in FIG. 7, can include other components that are not explicitly shown in FIG. 7, or might utilize an architecture completely different than that shown in FIG. 7.

The server 700 may support a virtualization layer 724 executing in the operating system 720. In some examples, the virtualization layer 724 may be supported by a hypervisor that provides one or more virtual machines running on the server 700 to perform functions described herein. The virtualization layer 724 may generally support a virtual resource that performs at least portions of the techniques described herein, such as performing the functions of the virtual network overlay.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A controller comprising:
   one or more processors; and
   one or more non-transitory computer-readable media storing computer-executable instructions that, when executed by the one or more processors, cause the one or more processors to:
   receive an interest packet header from a forwarding router node of a network overlay;
   determine, without path computation, an interest path of the interest packet and one or more destination router nodes of the network overlay;
   compute one or more paths over the network overlay, wherein each destination router node of the one or more destination router nodes is included in only one path of the one or more paths;
   determine an addressing method for the one or more computed paths over the network overlay;
   perform at least one of:
   encoding each computed path in a data packet header; and encoding each computed path as state entries of each router node of the network overlay on each respective path; and return the computed path information to the forwarding router node.

2. The controller of claim 1, wherein the received interest packet header comprises one or more information entries regarding router nodes along the interest path of the interest packet, and comprises one or more information entries regarding caching interest of each such router node.

3. The controller of claim 2, wherein one or more destination router nodes comprises an originating router node of the network overlay from which the interest path originates, and comprises one or more other caching router nodes of the network overlay having caching interest for named content requested by the interest packet.

4. The controller of claim 1, wherein the one or more paths are each no less optimal than the interest path according to at least topology of the network overlay.

5. The controller of claim 4, wherein the one or more paths are each no less optimal than the interest path according to topology of the network underlay.

6. The controller of claim 1, wherein an addressing method is selected from among unicast addressing and multicast addressing.

7. A method comprising:
receiving, by a controller, an interest packet header from a forwarding router node of a network overlay;
determining, by the controller, without path computation, an interest path of the interest packet and one or more destination router nodes of the network overlay;
computing, by the controller, one or more paths over the network overlay, wherein each destination router node of the one or more destination router nodes is included in only one path of the one or more paths;
determining, by the controller, an addressing method for the one or more computed paths over the network overlay;
performing, by the controller, at least one of:
encoding each computed path in a data packet header; and
encoding each computed path as state entries of each router node of the network overlay on each respective path; and
returning, by the controller, the computed path information to the forwarding router node.

8. The method of claim 7, wherein the received interest packet header comprises one or more information entries regarding router nodes along the interest path of the interest packet, and comprises one or more information entries regarding caching interest of each such router node.

9. The method of claim 8, wherein one or more destination router nodes comprises an originating router node of the network overlay from which the interest path originates, and comprises one or more other caching router nodes of the network overlay having caching interest for named content requested by the interest packet.

10. The method of claim 7, wherein the one or more paths are each no less optimal than the interest path according to at least topology of the network overlay.

11. The method of claim 10, wherein the one or more paths are each no less optimal than the interest path according to topology of the network underlay.

12. The method of claim 7, wherein an addressing method is selected from among unicast addressing and multicast addressing.

13. A non-transitory computer-readable storage medium storing computer-readable instructions executable by one or more processors of a controller, that when executed by the one or more processors, cause the one or more processors of the controller to perform operations comprising:
receiving an interest packet header from a forwarding router node of a network overlay;
determining, without path computation, an interest path of the interest packet and one or more destination router nodes of the network overlay;
computing one or more paths over the network overlay, wherein each destination router node of the one or more destination router nodes is included in only one path of the one or more paths;
determining an addressing method for the one or more computed paths over the network overlay;
performing at least one of:
encoding each computed path in a data packet header; and
encoding each computed path as state entries of each router node of the network overlay on each respective path; and
returning the computed path information to the forwarding router node.

14. The computer-readable storage medium of claim 13, wherein the received interest packet header comprises one or more information entries regarding router nodes along the interest path of the interest packet, and comprises one or more information entries regarding caching interest of each such router node.

15. The computer-readable storage medium of claim 14, wherein one or more destination router nodes comprises an originating router node of the network overlay from which the interest path originates, and comprises one or more other caching router nodes of the network overlay having caching interest for named content requested by the interest packet.

16. The computer-readable storage medium of claim 13, wherein the one or more paths are each no less optimal than the interest path according to at least topology of the network overlay.

17. The computer-readable storage medium of claim 16, wherein the one or more paths are each no less optimal than the interest path according to topology of the network underlay.

* * * * *